United States Patent
Cook et al.

[11] Patent Number: 6,004,112
[45] Date of Patent: Dec. 21, 1999

[54] BELT DRIVEN FLUID COMPRESSOR WITH SELF-ADJUSTING BELT TENSIONING DEVICE

[75] Inventors: Roger Cook, Warrington; Norman Philip Lowe, Wigan, both of United Kingdom

[73] Assignee: Ingersoll-Rand Company, Woodcliff Lake, N.J.

[21] Appl. No.: 09/066,685

[22] Filed: Apr. 27, 1998

[30] Foreign Application Priority Data

Apr. 8, 1998 [GB] United Kingdom ............... 9807778

[51] Int. Cl.$^6$ ................. F04B 17/03; F16H 7/08
[52] U.S. Cl. ................. 417/362; 417/53; 474/110
[58] Field of Search ............ 417/53, 362; 474/110, 474/112, 115

[56] References Cited

U.S. PATENT DOCUMENTS

| | | |
|---|---|---|
| 1,532,270 | 4/1925 | Shield . |
| 2,167,793 | 8/1939 | Barger . |
| 2,458,255 | 1/1949 | Couse . |
| 2,656,565 | 10/1953 | Apel et al. . |
| 2,666,863 | 1/1954 | Davis et al. . |
| 2,690,084 | 9/1954 | Van Dam . |
| 2,731,222 | 1/1956 | Poeschl et al. . |
| 3,477,670 | 11/1969 | Sloyan . |
| 3,768,324 | 10/1973 | Vanderstegen-Drake . |
| 4,094,205 | 6/1978 | Cook . |
| 4,283,181 | 8/1981 | Sproul . |
| 4,344,598 | 8/1982 | Sloyan . |
| 4,376,424 | 3/1983 | Mazur . |
| 4,597,746 | 7/1986 | Goscenski, Jr. . |
| 4,638,978 | 1/1987 | Jordan ......................... 254/228 |
| 4,940,447 | 7/1990 | Kawashima et al. . |
| 5,378,119 | 1/1995 | Goertzen ....................... 417/313 |
| 5,551,845 | 9/1996 | Milam ......................... 417/290 |

FOREIGN PATENT DOCUMENTS

| | | |
|---|---|---|
| 1 381 740 | 1/1975 | United Kingdom . |
| 2 122 717 | 12/1981 | United Kingdom . |
| 2 202 606 | 9/1988 | United Kingdom . |
| 2 208 905 | 4/1989 | United Kingdom . |

*Primary Examiner*—Tony M. Argenbright
*Assistant Examiner*—Arnold Castro
*Attorney, Agent, or Firm*—Michael M. Gnibus

[57] ABSTRACT

A compressor including a prime mover having an output element which supplies a motive force produced by the prime mover; a compression module having an input element; a tensioned belt connecting the prime mover output element and the compression module input element to transmit the motive force from the prime mover to the compression module, and a self-adjusting belt tensioning member for applying a substantially constant tensioning force to the belt to maintain substantially constant the predetermined required belt tension. The compressor also includes an anchor bracket connected to the compression module, and a locator plate connected to the anchor bracket, the locator plate being movable relative to the anchor bracket, the anchor bracket having a stop member for limiting movement of the locator plate.

15 Claims, 4 Drawing Sheets

BELT DRIVEN FLUID COMPRESSOR WITH SELF-ADJUSTING BELT TENSIONING DEVICE

BACKGROUND OF THE INVENTION

The invention relates to a belt driven fluid compressor and more particularly to a belt driven fluid compressor having a self-adjusting belt tensioning device that automatically maintains the required tension in the drive belt during compressor operation.

Rotary screw compressors traditionally include male and female rotors having interengaging, axially extending screw profiles. The rotors compress a fluid such as air, as the fluid is conveyed axially between the profiles during rotation of the rotors by a prime mover such as an electric motor. Typically, the male rotor includes an input element or shaft connected in motive force receiving relation with the output element or shaft of the prime mover by a drive belt tensioned with a predetermined required belt tension force.

Over time, the drive belt may stretch, or the distance between the output element and input element may change. Belt stretching and varying the distance between the input and output elements will cause the tension in the belt to deviate from the predetermined required tension. When the tension in the belt is not equal to the predetermined required tension value, the operation of the compressor is negatively affected. Therefore it is vital for efficient compressor operation that the predetermined required belt tension be maintained.

Helical springs have been included in prior art compressors to try to maintain the required drive belt tension. There are at least two shortcomings associated with using helical springs to maintain the required belt tension. First, by their design, the force exerted by any helical spring varies with its change in length. Therefore, the force exerted by each helical spring is dependent on its location relative to the belt. The helical springs are located in positions along the compressor that compress the springs the required amount to produce the total spring force necessary to achieve the required belt tension. However, as the belt stretches, and the springs decompress, the belt tensioning forces produced by the springs decrease resulting in a belt tension that is below the requisite tension force. When the drive belt is tensioned at less than the required tension force the belt is prone to slipping which reduces the efficiency of the compressor. Thus, during compressor operation the helical springs are not self-adjusting and do not continuously maintain the required belt tension in the drive belt.

A second shortcoming associated with the use of helical springs to maintain the required drive belt tension relates to the damping characteristics of helical springs. A helical spring has very little damping capacity and use of helical springs in fluid compressors can cause compressor components to oscillate or "bounce" under certain conditions, such as during compressor start up. Additionally, the helical springs do dissipate kinetic energy of the compressor components when a drive belt breaks.

Other known mechanisms for maintaining the required drive belt tension require periodic manual adjustment to maintain a constant belt tension over time. Such known systems frequently include an extendable and retractable member connected to a pulley, sprocket or other belt support member. When required, the length of the member is altered to move the belt support member and affect the belt tension. Such manually adjustable tension mechanisms are by their very nature not self-adjusting and do not automatically maintain the predetermined required belt tension.

Other known belt tensioning systems achieve the required belt tension through the use of complicated, expensive systems which frequently incorporate electronic controls to extend or retract hydraulic or pneumatic pistons to increase or decrease the belt tension to produce the desired tension in the drive belt.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, constant belt tension is maintained by a self adjusting tensioning device that includes a hydropneumatic actuator or gas spring which incorporates a fully enclosed self-contained gas and oil system as an accumulator. In such actuators, a constant force is exerted by the actuator, and damping can be provided by the actuator during extension, or retraction of the device or during both extension and retraction.

Therefore, no matter the position of the tension mechanism a substantially constant tensioning force is provided, and adequate damping can be provided to prevent bounce and avoid sudden movement and dissipation of kinetic energy of compressor components in case of belt breakage.

In summary, the invention is a fluid compressor, comprising: a prime mover having an output element which supplies a motive force produced by the prime mover; a compression module having an input element; motive force transmitting means for transmitting the motive force from the prime mover to the compression module, said motive force transmitting means connecting the output and input elements, and said means having a predetermined required tension; and self-adjusting means for applying a substantially constant tensioning force to the motive transmitting means to maintain the predetermined required tension in said motive force transmitting means substantially constant.

Additionally, the invention includes an anchor bracket connected to the compression module, and a locator plate connected to the anchor bracket and the locator plate is movable relative to the anchor bracket, and further, the anchor bracket has a stop member for limiting movement of the locator plate. The locator plate is rotatable about an axis between a first position where the motive force transmitting means tension is not at the predetermined required tension force, and a second position where the locator plate is in contact with the stop member and the motive force transmitting means tension is at the predetermined required tension force.

Additionally, the locator plate includes a hub having a recess the hub is adapted to receive a tool or other member for moving the locator plate between the first and second positions.

The foregoing and other aspects will become apparent from the following detailed description of the invention when considered in conjunction with the accompanying drawing figures.

DESCRIPTION OF THE DRAWING FIGURES

DESCRIPTION OF THE PREFERRED EMBODIMENT

Figure 1:
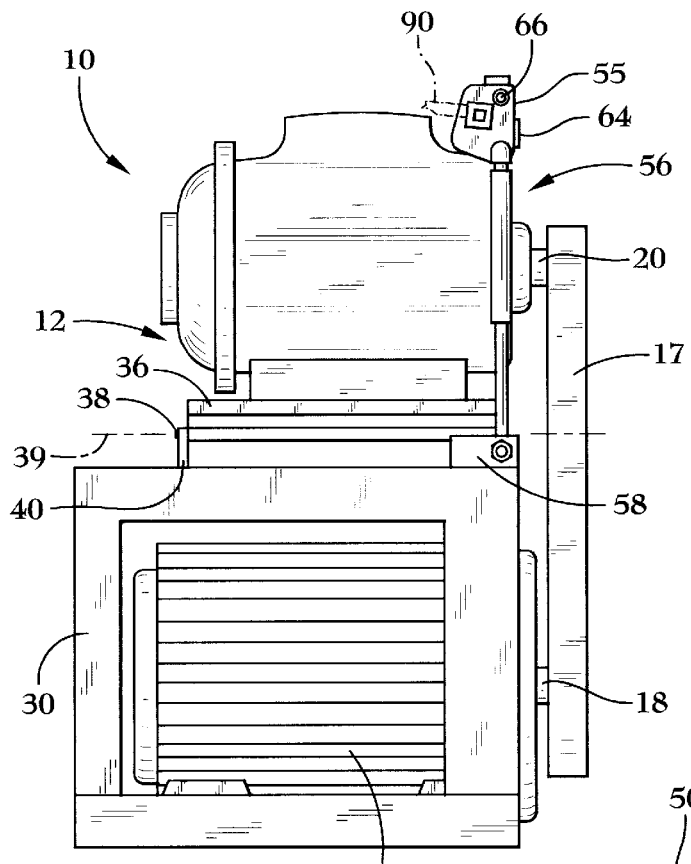
FIG. 1 is a front elevation view of a fluid compressor that includes the self-adjusting belt tensioning device of the present invention.

Turning now to the drawings wherein like parts are referred to by the same number throughout the several views, and particularly FIG. 1, fluid compressor identified generally at 10 includes a conventional compression module or airend 12 with interengaging male and female rotors (not shown). The male and female rotors are of the type that are well known to one skilled in the related art and therefore further description of the rotors is not required. The compressor rotors are driven by prime mover 16 which is for purposes of the description of the preferred embodiment an electric motor. The motive force produced by the prime mover is transmitted to the compressor airend by belt connection 17 between the prime mover 16 and airend 12.

Figure 2:
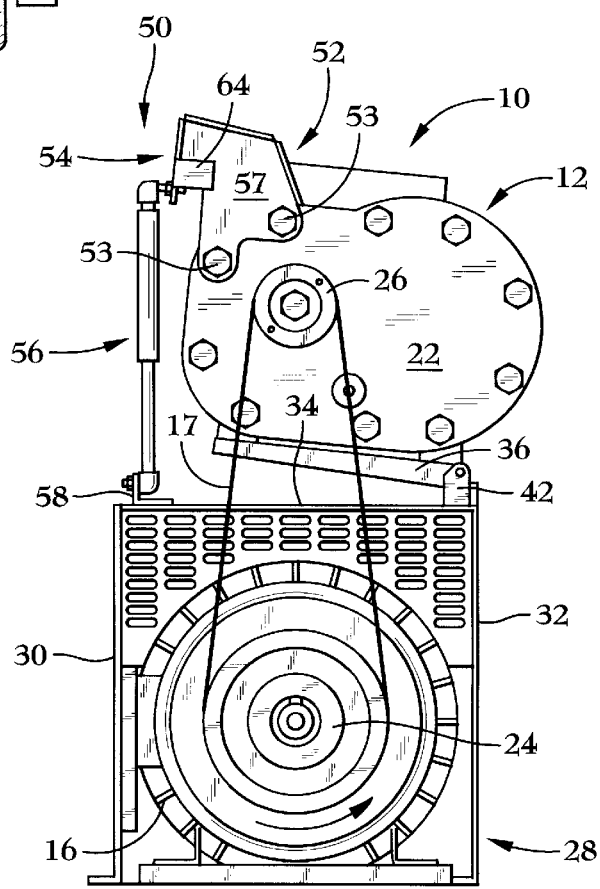
FIG. 2 is a right side view of the compressor of FIG. 1.

As shown in FIG. 1, prime mover motive force output shaft 18 extends from one end of prime mover 16 and compressor input shaft 20 is made integral with the male rotor and extends through airend endplate 22 and is parallel to shaft 18. Conventional pulleys 24 and 26 are respectively connected to the output and input shafts 18 and 20. As shown in FIG. 2, the pulleys are coplanar.

The prime mover 16 is substantially enclosed by a prime mover housing 28 having a first longitudinal side 30 and second longitudinal side 32 joined by top 34.

The airend 12 is fixed to a tilt table 36 by a weld connection or other well known conventional connection techniques. An elongate rod member 38 extends longitudinally through tilt table 36 and is supported at the ends by first and second support posts 40 and 42 which in turn are fixed to the top 34 of prime mover housing 28. The tilt table is rotatable about axis 39 which is defined by elongate rod 38.

Self-adjusting belt tensioning device identified generally at 50 includes an anchor bracket 52 attached to airend endplate 22 by bolts 53, locator plate 54 which during belt tensioning is movably attached to anchor bracket 52, and self tensioning member 56 which joins the locator plate and bracket 58 fixed to top housing side 34. See FIG. 3. The locator plate 54 which is movably attached to anchor bracket 52 during belt tensioning is fixed to the anchor bracket after tensioning of the belt is completed.

Figure 4:
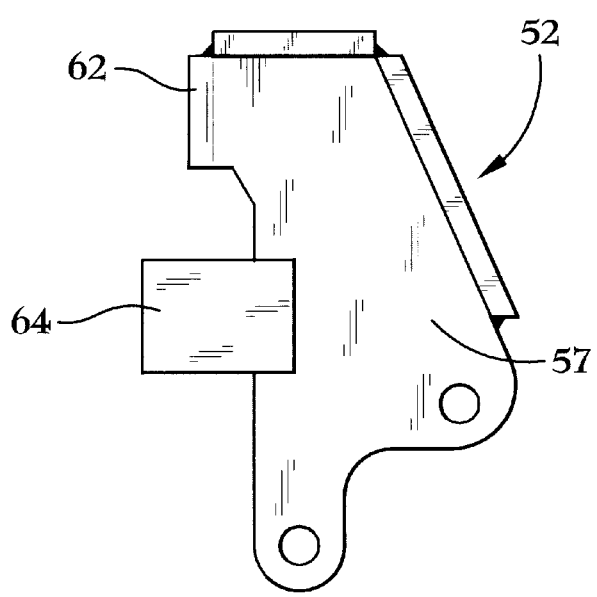
FIG. 4 is a right side view of the anchor bracket of the self-adjusting belt tensioning device of FIG. 1.
Figure 5:
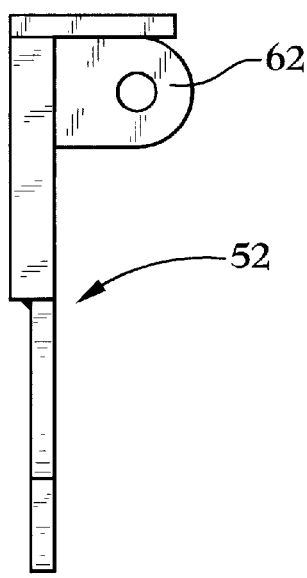
FIG. 5 is a rear view of the anchor bracket of FIG. 4.
Figure 6:
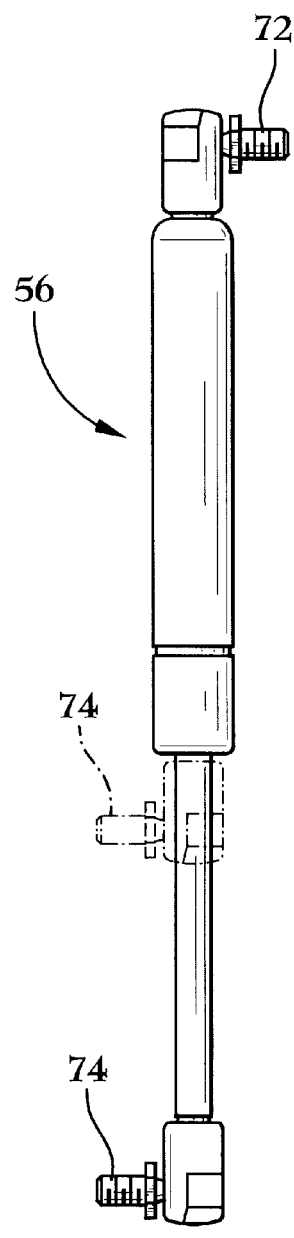
FIG. 6 illustrates the extended and retracted positions of the self contained self tensioning member.

As shown in FIGS. 4 and 5, the unitary anchor bracket includes flange 62 that is perpendicular to the main anchor bracket portion 57 and stop member 64 that is made integral with anchor bracket portion 57 by a weld or other suitable connection.

Figure 3:
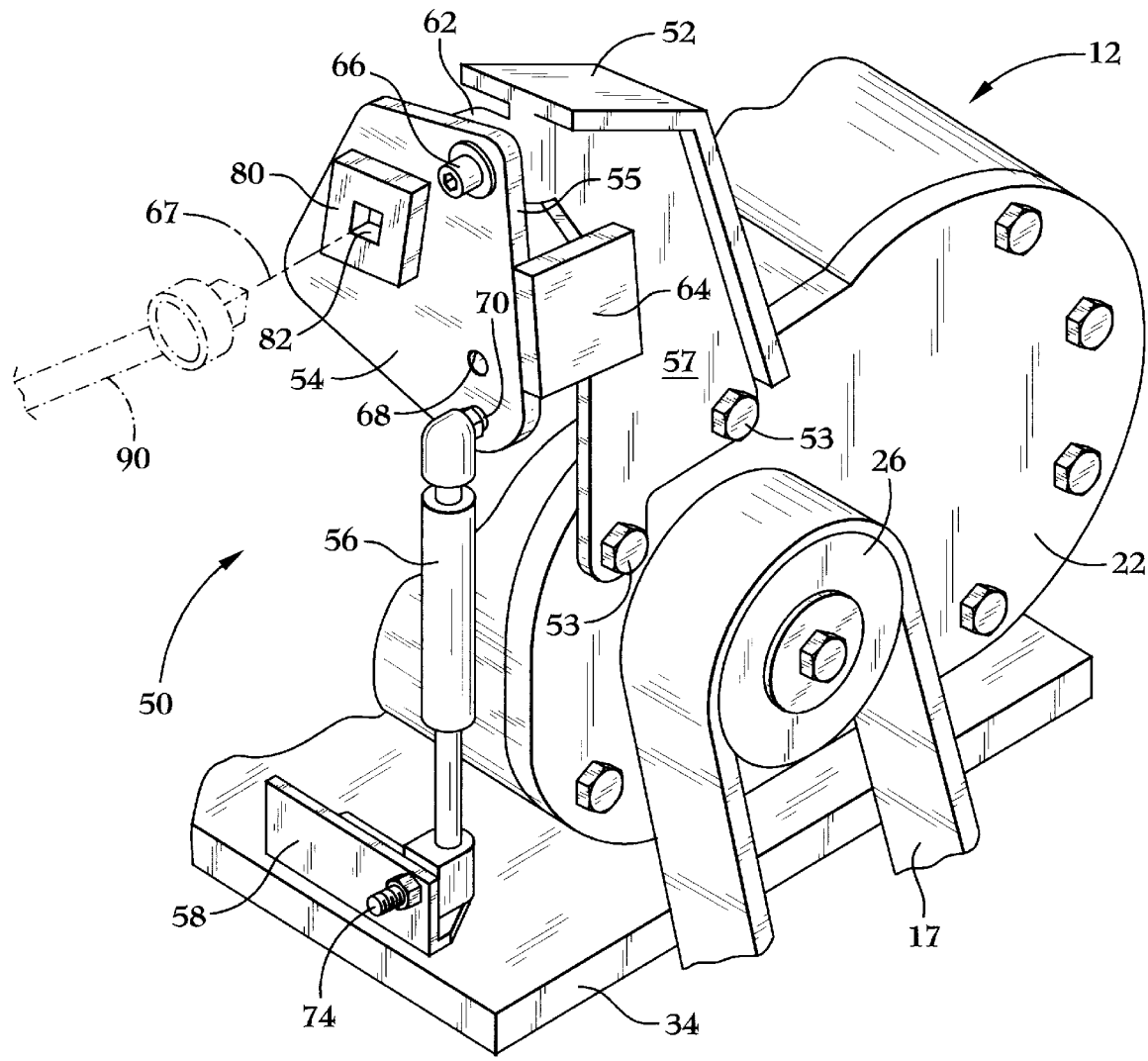
FIG. 3 is an isometric view of the self-adjusting belt tensioning device shown in FIG. 1.

Unitary locator plate 54 is connected to anchor bracket flange 62 by a bolt connection 66 or other suitable connection member. The bolt connection 66 defines an axis of rotation 67 for the locator plate 54. The locator plate includes a contact edge 55, and two apertures 68 and 70 which are both adapted to receive post 72 at the upper end of self tensioning member 56. The post is inserted in the aperture that will extend the self-tensioning member 56 the amount required to produce the desired belt tension. For purposes of describing the preferred embodiment of the invention, post 72 is located in aperture 70, as illustrated in FIG. 3. The post 74 at the lower end of the self tensioning member is located in an aperture provided in bracket 58. Square hub 80 is made integral with plate 54, and the hub includes a recess 82 that is adapted to receive the end of a tool or other elongate member used to rotate the locator plate about axis 67 during tensioning of the belt. Rotation of the locator plate and belt tensioning will be described in greater detail below.

Bracket 58 has a substantially L-shaped cross-section with one of the bracket legs fixed to the housing top 34 and the other leg extending upward away from the top housing side.

The self-tensioning member 56 is a gas spring which is also referred to by those skilled in the pertinent art as a hydropneumatic actuator. The gas spring incorporates a fully enclosed gas and oil system as an accumulator. The operational characteristic of gas spring 56 that permits the self-adjusting tensioning device 50 to maintain constant tension in belt 17 is the ability to maintain the force exerted by the gas spring constant regardless of the compression or extension of the spring. For example, over time as the belt stretches, the force exerted by the gas spring will remain constant to thereby maintain constant belt tension. Therefore, no matter what the relative positions of the belt tension mechanisms, a substantially constant belt tension force is assured.

Additionally, the gas spring provides damping during spring extension, retraction or both. Also the adequate damping characteristics can be provided to prevent "bounce" and avoid sudden movement and dissipation of energy in case of belt breakage. Thus the self adjusting tension device 50 of the present invention overcomes the shortcomings associated with known conventional belt tensioning devices.

Assembly of device 50 and tensioning of belt 17 will now be described. The bracket 58 and support posts 40 and 42 are fixed to the housing top 34 in their required locations and then the airend 12 is fixed on table 36. The table is located between the posts and rod 38 is slid through the posts and table and is supported by the posts at the rod ends. Coil springs or other known conventional biasing members may be provided along the length of the rod to maintain the rod above the housing top as shown in FIGS. 1 and 2.

Table 36 is then rotated counterclockwise about axis 39 so that the distance separating pulleys 24 and 26 is decreased a sufficient amount to permit belt 17 to be placed around the pulleys 24 and 26. After the belt is placed around the pulleys, the table is released and is drawn upwards by the belt tension to a position above housing top 34.

The anchor bracket is bolted to the airend endplate 22 adjacent pulley 26 so that flange 62 is facing housing side 30 and stop member 64 is along the exterior side of endplate 22.

Locator plate 54 is then bolted to flange 62 but is not fixed to the flange. Initially, the locator plate is permitted to rotate about the axis 67 defined by bolt 66.

Lower post 74 of self tensioning member 56 is inserted through bracket 58 and the tensioning member 56 is permitted to rotate about the post 74. A nut is tightened onto the post 74 to prevent the post from moving out of the bracket 58.

Figure 7A:
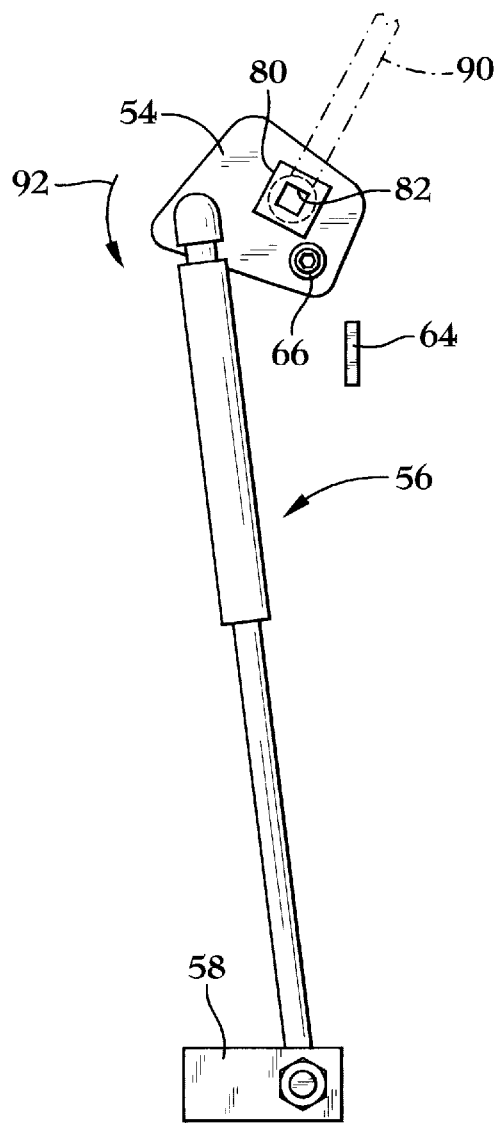
FIGS. 7A and 7B schematically illustrate the movement of the connector plate and self-tensioning member during belt tensioning.
Figure 7B:
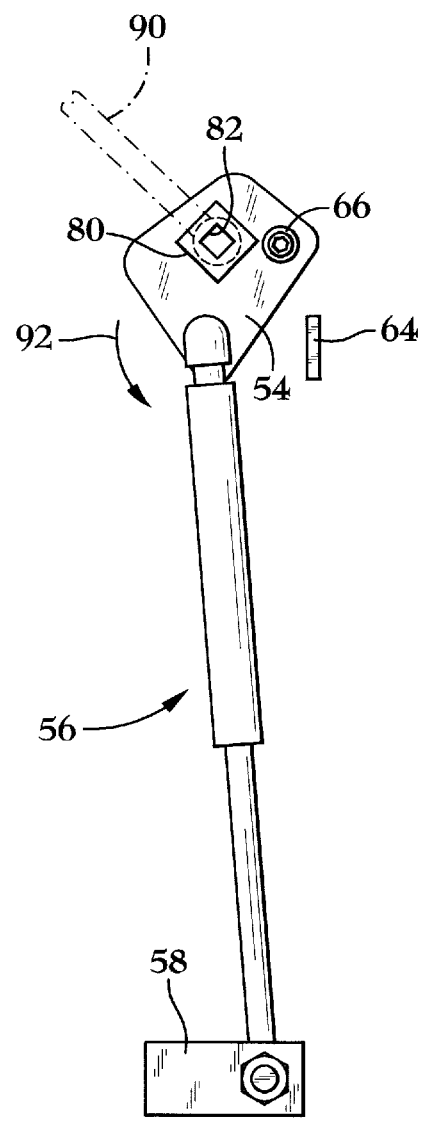

Referring to the schematic representations of device 50 shown in FIGS. 7A and 7B, the tensioning member 56 is extended and upper post 72 is inserted in locator plate aperture 70. As shown in FIG. 7A, when the post 72 is located in the aperture, the plate 52 is rotated clockwise about axis 67 so that plate edge 55 is located away from stop plate 64. After post 72 is located in the aperture, a nut is tightened onto the post in the same way the nut was previously tightened to post 74. Limited rotation of tensioning member about post 72 is permitted.

The end of a tool 90 which may be a wrench, ratchet or the like, is inserted in recess 82 of hub 80. The tool is moved in an arcuate counterclockwise path in the direction of arrow 92 and causes the locator plate to rotate about axis 67 in the same counterclockwise direction. Movement of the locator plate, moves the aperture 70 downward causing the tensioning member 56 to compress. Compare FIGS. 7A and 7B. Continued movement of tool moves the locator plate 52 which causes the tensioning member to compress. Tool 90 is moved in a counterclockwise direction until edge 55 contacts the stop member 64 as shown in FIGS. 1 and 3. The tool end is then removed from the recess 82 and the belt 17 is tensioned with the requisite force. The tensioning member 56 maintains the requisite tensioning force in belt 17 during operation of compressor 10 and thereby provides more efficient compressor operation.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A fluid compressor, comprising:
   a) a prime mover having an output element which supplies a motive force produced by the prime mover;
   b) a compression module having an input element;
   c) motive force transmitting means for transmitting the motive force from the prime mover to the compression module, said motive force transmitting means connecting the output and input elements, and said means having a predetermined required tension;
   d) self-adjusting means for applying a substantially constant tensioning force to the motive transmitting means to maintain substantially constant the predetermined required tension in said motive force transmitting means;
   e) an anchor bracket connected to the compression module; and
   f) a locator plate connected to the anchor bracket, the locator plate being movable relative to the anchor bracket, the anchor bracket having a stop member for limiting movement of the locator plate.

2. The compressor as claimed in claim 1 wherein the self-adjusting means for supplying a substantially constant tensioning force is a hydropneumantic actuator.

3. The compressor as claimed in claim 1 wherein the compressor includes a frame substantially enclosing the prime mover, the self-adjusting means has a first end connected to the locator plate and a second end fixed to the frame.

4. The compressor as claimed in claim 1 wherein the self-adjusting tensioning means has a first end connected to the locator plate.

5. The compressor as claimed in claim 1, the locator plate having an axis said locator plate being rotatable about said axis between a first position where the motive force transmitting means tension is not at the predetermined required tension force and a second position where the locator plate is in contact with the stop member and the motive force transmitting means tension is at the predetermined required tension force.

6. The compressor as claimed in claim 5 wherein the locator plate includes a hub having a recess adapted to receive a member for moving the locator plate between the first and second positions.

7. The compressor as claimed in claim 1 wherein the compression module is located above the prime mover; the output element of the prime mover located below the input element of the compression module; the self-adjusting means extending substantially vertically between the prime mover and the compression module.

8. A belt driven fluid compressor comprising a compression module driven by a prime mover having a prime mover housing; a belt having a tension, said belt connecting the prime mover and compression module; and a self-adjusting belt tensioning device comprising an anchor bracket connected to the compression module, a locator plate connected to the anchor bracket, the locator plate being movable relative to the anchor bracket, the anchor bracket having a stop member for limiting movement of the locator plate, said self-adjusting belt tensioning device further including a self-tensioning member having a first end connected to the locator plate and a second end connected to the prime mover housing, said self-tensioning member for maintaining a constant tension in the belt.

9. The belt driven fluid compressor as claimed in claim 8 wherein the self-adjusting belt tensioning device is a hydropneumatic actuator.

10. The compressor as claimed in claim 8, the locator plate having an axis said locator plate being rotatable about said axis between a first position where the motive force transmitting means tension is not at the predetermined required tension force and a second position where the locator plate is in contact with the stop member and the motive force transmitting means tension is at the predetermined required tension force.

11. The compressor as claimed in claim 8 wherein the locator plate includes a hub having a recess adapted to receive a member for moving the locator plate between the first and second positions.

12. In a belt driven fluid compressor comprising a compression module driven by a prime mover having a prime mover housing; a belt having a tension, said belt connecting the prime mover and compression module; and a self-adjusting belt tensioning device comprising an anchor bracket connected to the compression module, a locator plate connected to the anchor bracket, the locator plate being movable relative to the anchor bracket, and a self-adjusting belt tensioning device further including a self tensioning member having a first end connected to the locator plate and a second end connected to the prime mover housing; the method of tensioning the belt comprising the steps of: moving the locator plate in a first direction causing the self-tensioning member to compress and thereby produce the required belt tension.

13. The method of claim 12 wherein the locator plate includes an axis and an edge, and the anchor plate includes a stop member, the method including the further step of moving the locator plate until the edge contacts the stop member.

14. The method of claim 13 wherein the movement of the locator plate is comprised of rotating the locator plate about the locator plate axis.

15. The method of claim 12 wherein the self-tensioning member is a gas spring that is extendable and retractable, the gas spring having a first end, a second end, the method including the additional steps of extending the gas spring, connecting the first end to the prime mover housing, and connecting the second end to the anchor bracket, wherein the additional steps are performed before the locator plate is moved.

* * * * *